A. FOSTER.
Grain Separator.
No. 21,877. Patented Oct. 26, 1858.
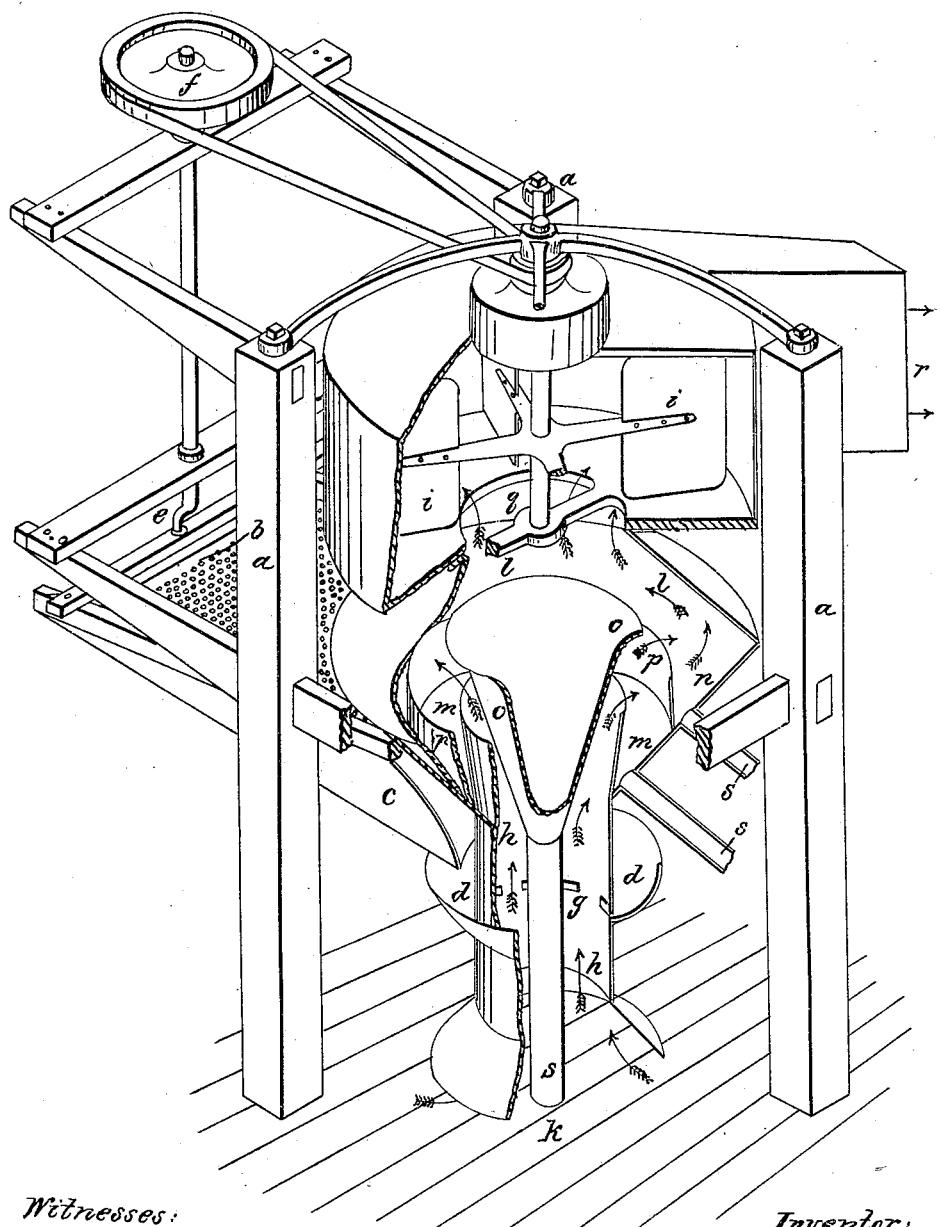
Witnesses:
Cha. E. Andrews
Thomas J. Woduff.
Inventor:
Aaron Foster

UNITED STATES PATENT OFFICE.

AARON FOSTER, OF QUINCY, ILLINOIS.

GRAIN-SEPARATOR.

Specification of Letters Patent No. 21,877, dated October 26, 1858.

*To all whom it may concern:*

Be it known that I, AARON FOSTER, of Quincy, in the county of Adams and State of Illinois, have invented certain new and useful Improvements in Grain-Separators; and I do hereby declare that the following is a full and exact description thereof, reference being had to the accompanying drawing, which is a perspective view of the machine, with portions removed to show the interior.

In cleaning wheat and separating it from the cheat and other seeds and foreign substances with which it unavoidably becomes mixed, as well as dividing the sound heavy grain, from that which is light or imperfectly formed, it is desirable that not only shall the good wheat be perfectly separated from the rest, but that the mixture of unsound or light grain, cheat, &c., after being parted from the good wheat, shall itself be separated and assorted according to the various qualities of its components.

My improvements are designed to effect this object, so that after dividing the good wheat from the "offal" the latter is separated and deposited into several different compartments the first of which receives the heavier portion of the light grains, cheat, &c., the second a lighter and more inferior quality, and the third compartment receiving the remainder which is nearly worthless while the chaff, dust, &c., is drawn off by the fan blower; thus at one operation, cleaning the wheat and bringing the "offal" to a salable condition for horse feed or otherwise.

In the drawing ($a\ a\ a$) represent the posts of the frame, one being removed to show the parts within.

($b$) is a sifter onto which the wheat is poured, and beneath which is an inclined spout ($c$) which receives the wheat and conducts it to the annular hopper ($d$). The sifter ($b$) and spout ($c$) are agitated by the crank ($e$) driven by the pulley above ($f$). The wheat passes from the annular hopper ($d$) through the slits ($g$) and falls in thin streams into the cylindrical air passage ($h$) where it is met in its descent by a strong current of air (as indicated by the arrows) which is drawn through the machine by the revolving fan blower ($i$) in the upper part of the apparatus. The air enters under the expanded end of the air passage ($h$), and meeting the wheat, carries with it in its upward passage all the light grains, cheat, chaff, dust, &c., the strength of the draft being so modified as to allow nothing but the heavy sound wheat to fall in opposition to it, to the floor ($k$). At its upper end the air passage ($h$) opens into the air chamber ($l$) the lower part of which forms two annular receptacles ($m$ and $n$). The current of air ascending through the passage ($h$) is spread out as it enters the chamber ($l$) by means of the trumpet shaped cone ($o$), and as it expands from the contracted passage to the enlarged space in the chamber, its velocity is diminished, which allows the matter borne upon it to fall, first the heaviest of the light grain and cheat, which drop into the chamber ($m$), then a lighter portion passes on and drops into the chamber ($n$) divided from the other by the ring partition ($p$). A still lighter portion of the "offal" is carried on by the air as it returns toward the center in its course to the fan blower, and is received by the open mouth of the cone ($o$), while the air bearing with it the chaff, dust, &c., is drawn up through the opening ($q$) into the revolving fan blower ($i$) from whence it is discharged at ($r$). The several receptacles for the assorted "offal" are provided with suitable outlets ($s\ s\ s$) leading to separate chambers.

What I claim as my invention and desire to secure by Letters Patent is:

The arrangement of the annular receptacles ($m$ and $n$) in combination with the trumpet shaped cone ($o$); and also the employment of the interior of said cone ($o$) as an additional receptacle; together, for the purpose of assorting the mixed grains after separation from the wheat according to their respective qualities, substantially as described.

AARON FOSTER.

Witnesses:
CHAS. E. ANDREWS,
THOMAS T. WOODRUFF.